3,311,070
LIGHT TABLE
Verl N. Barzee, 708 Knickerbocker Drive 94087, and Joseph J. Harapat, 1105 W. Iowa Ave. 94086, both of Sunnyvale, Calif.
Filed Nov. 15, 1965, Ser. No. 507,812
7 Claims. (Cl. 108—23)

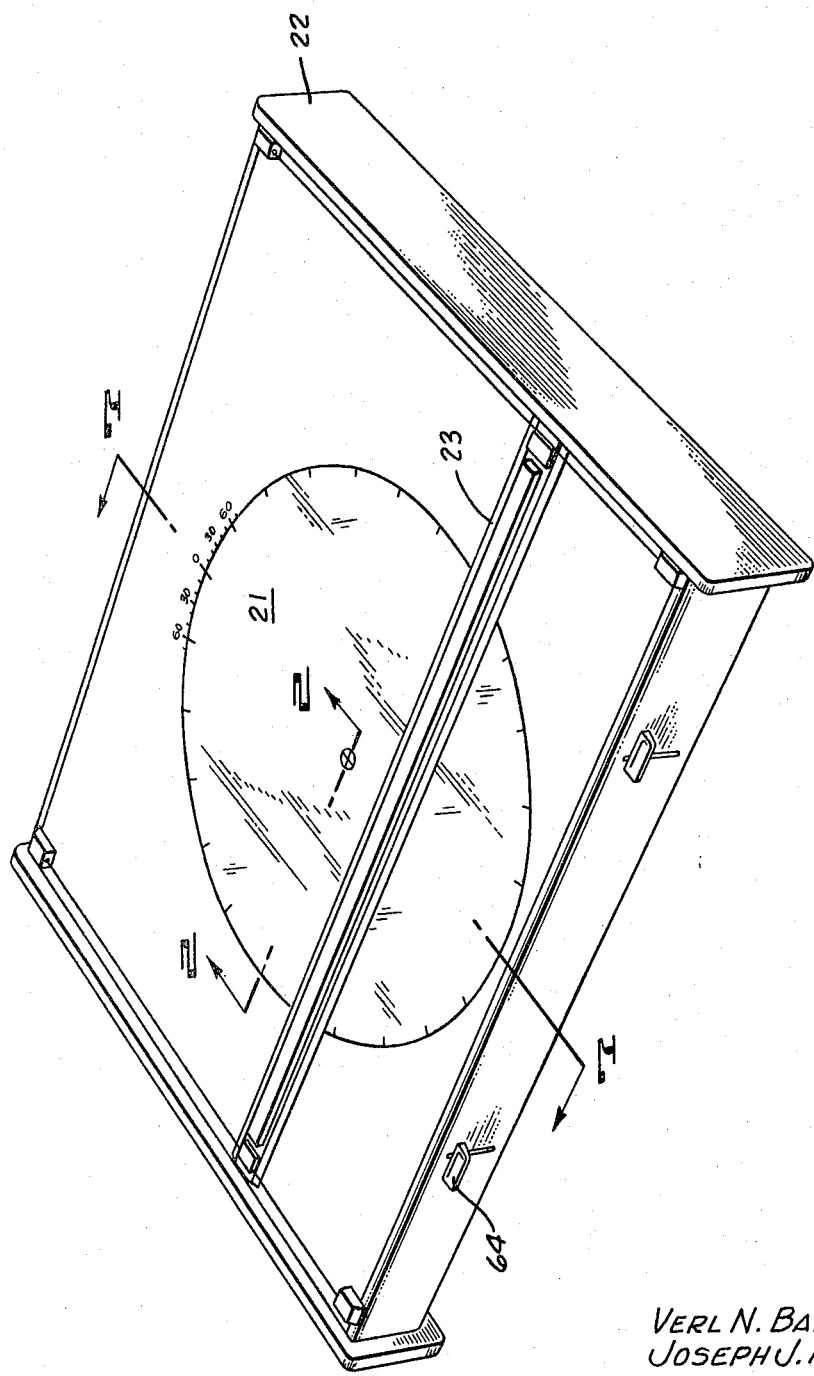

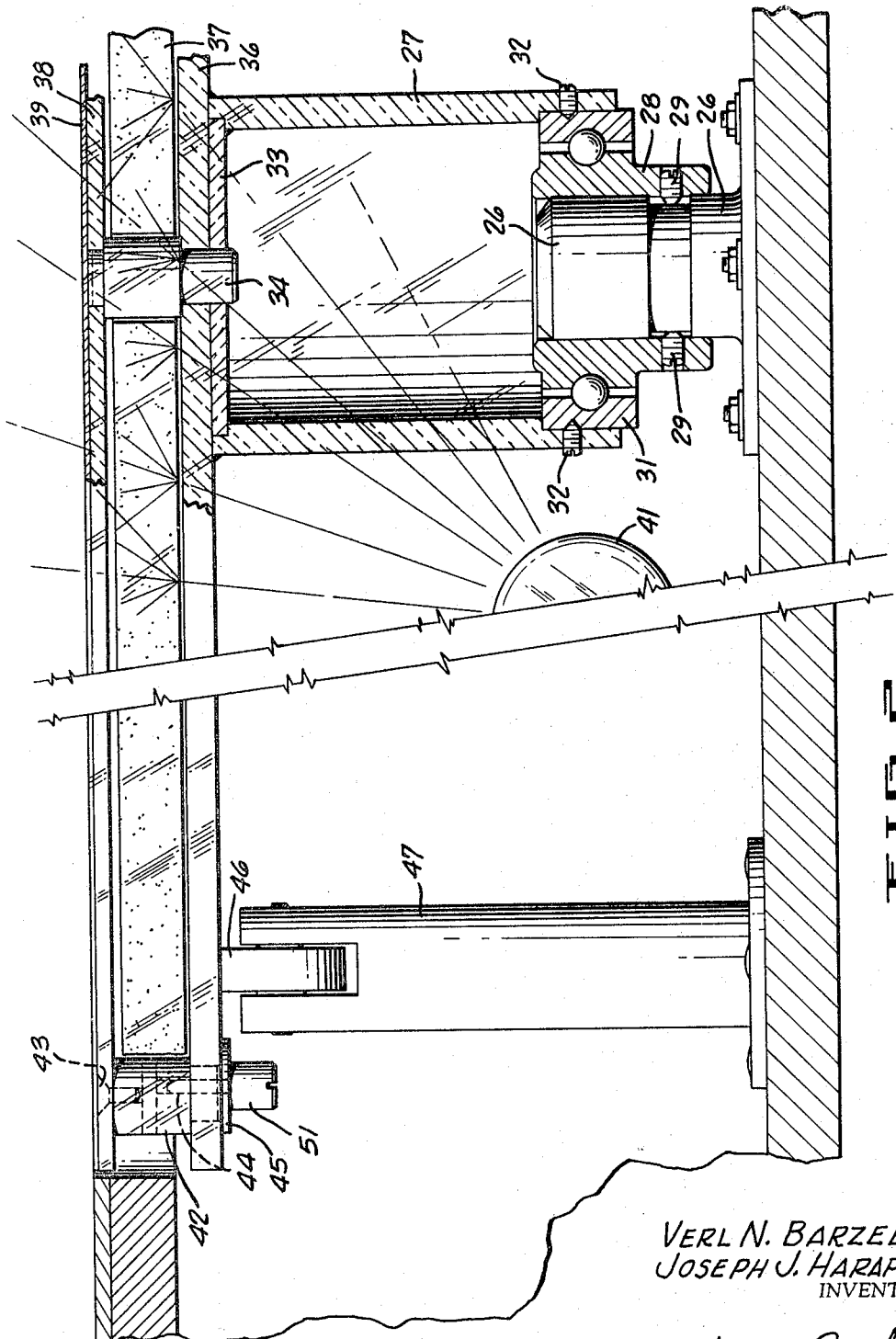

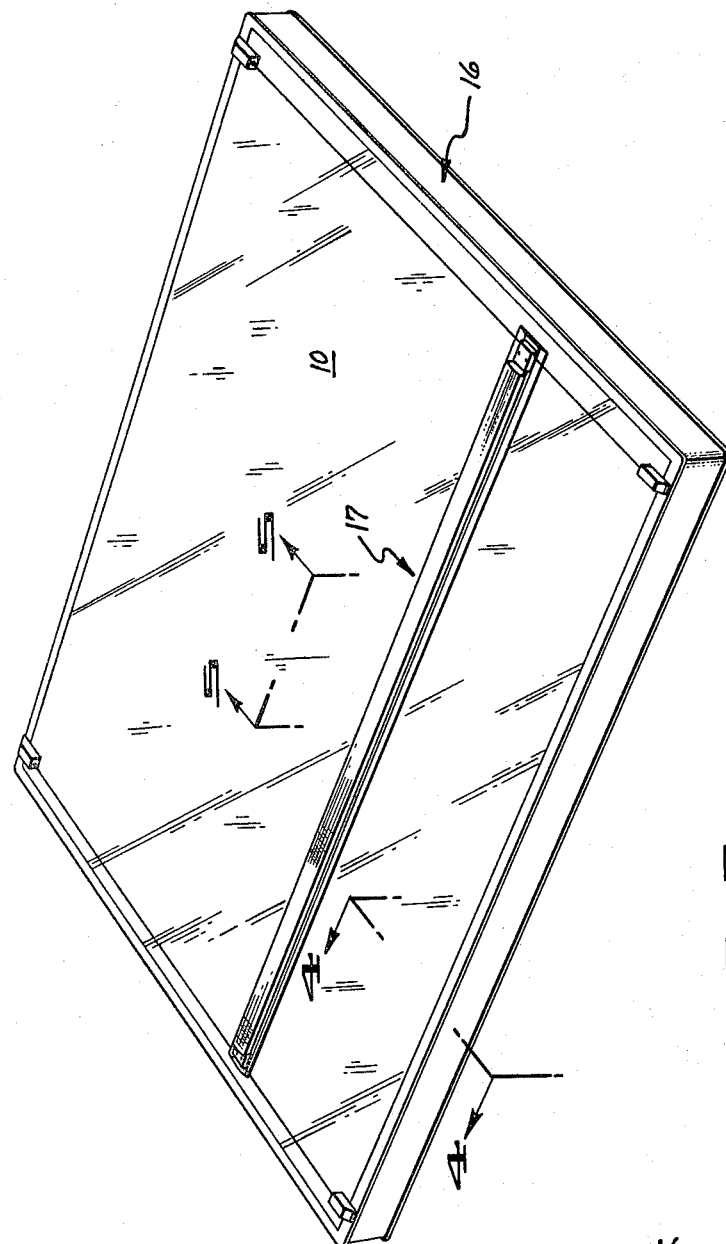

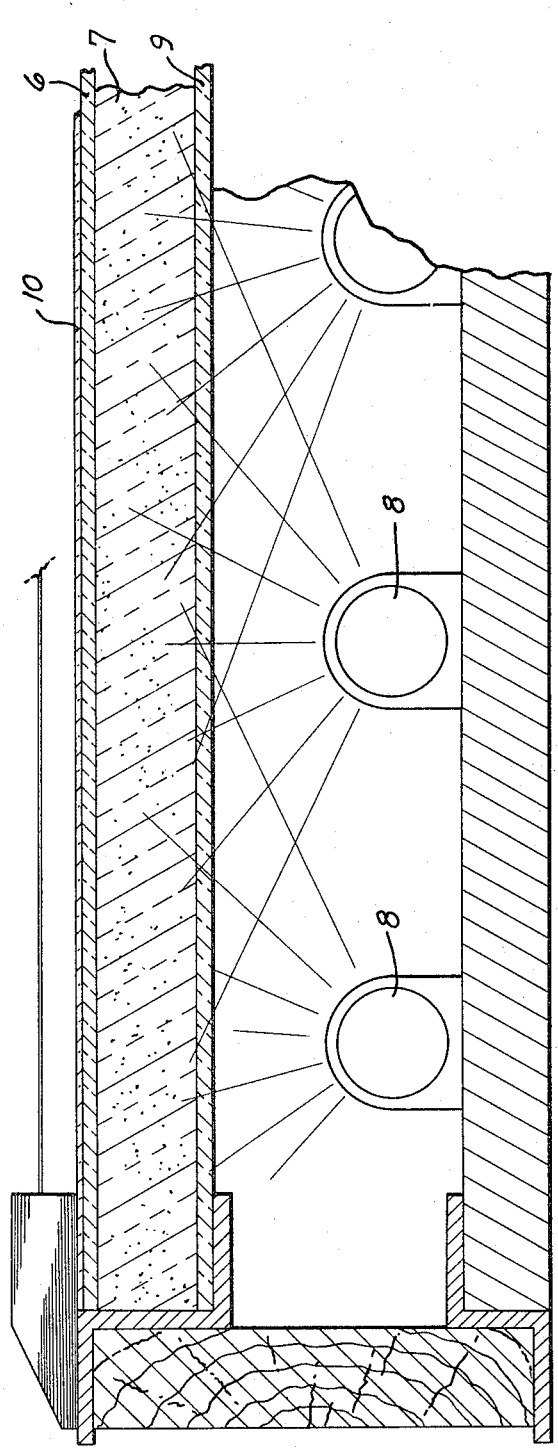

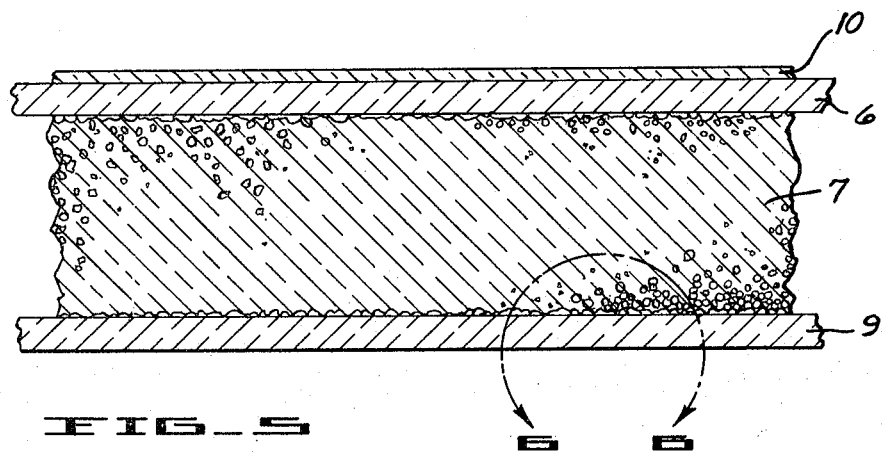
FIG_5
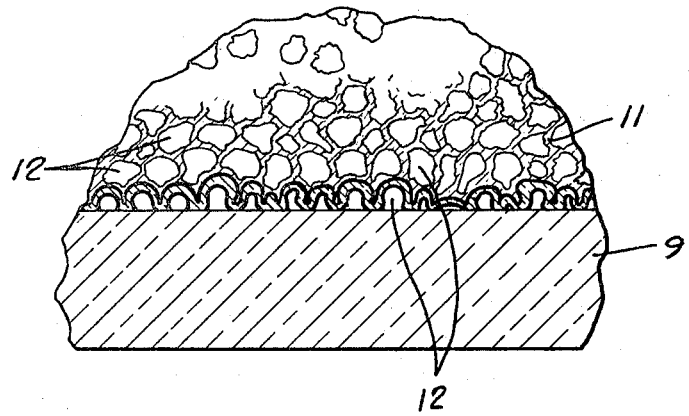
FIG_6
VERL N. BARZEE
JOSEPH J. HARAPAT
INVENTORS
BY Warren, Brosler
Cypher and Anglim
ATTORNEYS March 28, 1967 V. N. BARZEE ETAL 3,311,070
LIGHT TABLE
Filed Nov. 15, 1965 6 Sheets-Sheet 6
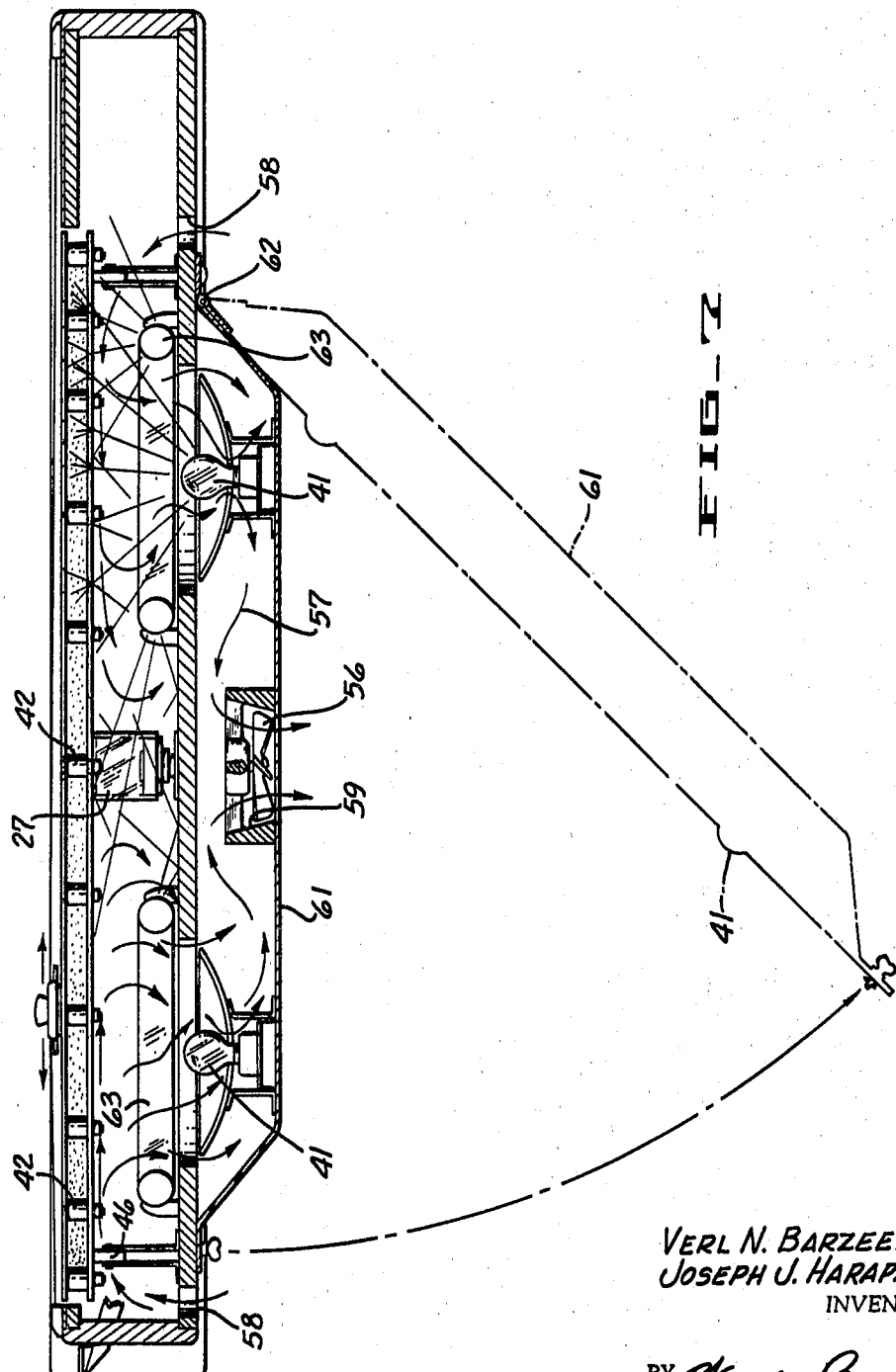
FIG_7
VERL N. BARZEE
JOSEPH J. HARAPAT
INVENTORS
BY
ATTORNEYS

United States Patent Office 3,311,070
Patented Mar. 28, 1967

The present invention relates to light tables and particularly to tables used for drafting.

An object of the present invention is to provide a new and improved light table.

Another object is to provide a light table having a more uniform luminosity at the drafting surface.

Still another object is to provide a table of the character described which is thin, light and portable.

A still further object is to provide a table of the character described which may be manufactured from relatively inexpensive durable materials in which the light transmitting characteristics of the transparent and translucent parts will remain substantially constant.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

With reference to said drawings (six sheets):

FIGURE 1 is a perspective view of the device as constructed in accordance with the present invention.

FIGURE 2 is an enlarged fragmentary cross-section of a portion of the device taken substantially along the line 2—2 of FIGURE 1.

FIGURE 3 is a perspective view of a modified form of the present invention.

FIGURE 4 is an enlarged fragmentary cross-section of a portion of the device taken substantially along the line 4—4 of FIGURE 3.

FIGURE 5 is an enlarged fragmentary cross-section of a portion of the device taken substantially along the line 5—5 of FIGURE 3.

FIGURE 6 is an enlarged fragmentary cross-section of a portion of the device taken substantially along the line 6—6 of FIGURE 5.

FIGURE 7 is a cross section of the device taken generally along line 7—7 of FIGURE 1.

Referring to the modified form of the device as shown in FIGURES 3, 4, 5 and 6, the light table consists briefly of a rigid light transmitting planar sheet 6; a translucent closed cell plastic foam planar sheet 7 positioned in subproximally face to face relation with the rigid sheet; means positioning the sheets relative to one another; a light source 8 mounted adjacent the translucent sheet; and the translucent sheet diffusing the rays from the light source to present a uniform non glare lighting at the surface of the rigid sheet.

We have found that rigid polystyrene foam has properties which are uniquely suitable for use in light tables used in tracing and other drafting work. Polystyrene gives a very uniform luminosity at the working surface and does not change color under the effects of sunlight and heat. The material is very light and relatively inexpensive.

We have also found that the diffusion of the light is greatly enhanced if the cells immediately adjacent the light transmitting outer faces of the translucent sheet are intersected and form an open porous surface in the polystyrene. One method of achieving this porous surface is to mechanically saw the polystyrene rather than to subdivide the polystyrene blocks by use of a heated wire. The heated wire melts the polystyrene and closes the pores of the cells thereby giving an inferior light transmitting characteristic.

In constructing drafting tables, surface areas of 3 feet by 4 feet or larger are common and the weight factor in constructing a substantially planar rigid surface becomes a critical factor. By bonding the polystyrene sheet directly to the rigid light transmitting sheet a laminated beam structure is formed adding substantially to the rigidity of the table. By adding a second light transmitting rigid sheet 9 disposed in parallel relation to the first rigid sheet an extremely strong sandwich construction is achieved requiring no other internal supports. The unsupported beam structure is essential to a light table since there are no parts to create shadows at the working surface. There are many materials which will bond polystyrene but it is necessary to use a transparent bonding agent. One such bonding agent which unexpectedly was found to be suitable is a product marketed under the trademark Splac.

The rigid light transmitting sheets may be glass, plexiglass or other rigid plastic material. Such materials present a surface which is too hard for drafting and the table has therefore been provided with an elastomeric vinyl sheet 10 overlaying the rigid sheet providing the drafting surface. Vinyl has excellent light transmitting characteristics and the material has a "memory" characteristic against deformation and therefore responds almost immediately to recreate a smooth planar surface after a line has been drawn by a sharp edged pencil or pen. Vinyl having a thickness of about .040 inch gives a satisfactory surface.

For standard boards, a plexiglass thickness of about one-eighth inch and a sheet of polystyrene about three-fourths to one inch in thickness gives a rigid board with excellent light diffusing characteristics.

In order to more clearly explain the porous surface of sawed polystyrene a greatly enlarged cross-section is shown in FIGURE 6. The polystyrene is indicated by a closed cell web 11 and the void cells 12. At surface 13 of the plexiglass sheet the cells 12 are open. As here shown in the modified form the light table is shown in a rectangular drafting board 16 provided with a parallel straight edge 17.

The preferred form of the device is shown in FIGURE 1 having a drafting surface 21 mounted for rotation in a drafting table 22 having a parallel straight edge 23. Referring to FIGURE 2, the rotating table is provided with a support 26 and a transparent cylindrical hub 27 rotatably mounted on the support and mounting the rigid sheet. The mounting more specifically consists of a bearing 28 connected to the support by set screws 29 with the plexiglass hub 27 mounted on the outer race 31 of the bearing by set screws 32. The hub is provided with a clear plastic cap 33 provided with an opening for receiving a clear plastic shaft 34 which may be made of Lucite. The shaft 34 is inserted through openings in the lower plexiglass sheet 36, the polystyrene sheet 37 and the upper plexiglass sheet 38. A plasticized calendared polyvinyl chloride sheet 39 provides a smooth planar surface covering the mounting holes necessary for receipt of the shaft 34.

Light rays from a light source 41 are able to pass through the light transmitting hub 27 and the Lucite shaft 34 without causing appreciable shadows at the surface.

In the form of the invention shown in FIGURE 2, the polystyrene sheet 37 is not integrally bonded to either the top or the bottom plastic sheets. The sheets are spaced and held together by a plurality of light transmitting spacer members 42 which may be made of Lucite or plexiglass. The spacers are attached to the top plexiglass member 38 by means of a flat head screw 43. The spacer may also be attached to the lower plexiglass sheet 36 in a similar manner or as here shown a stud 51 mounted on a screw shaft 44 holds a washer 45 in contact with the bottom sheet 36.

For very large tables which must be held to precise tolerances the outer edge is supported by a plurality of rollers 46 mounted on support 47.

Another feature of the use of polystyrene as a light diffuser in tracing tables is its good insulating characteristics. The surface of the table remains at approximately room temperature even though the heat generated by the lights beneath the table is considerable. The heat from the lights may be dissipated and removed from the underside of the table by a fan 56 which circulates air as indicated by arrows 57. The cool air enters openings 58 and is exhausted by the fan through discharge port 59.

The lights may be mounted on a panel 61 which is pivoted at point 62 so that the bulbs may be quickly and easily changed. Fluorescent lights 63 also may be used. The lights may be turned on at any point and a handle 64 is here shown mounted on the front edge panel of the board for convenience. A dimmer switch (not shown) gives the desired intensity of illumination.

We claim:
1. A light table and drafting board comprising:
   a rigid light transmitting planar sheet;
   a translucent closed cell plastic foam planar sheet positioned below, contiguous to and in face to face relation with said rigid sheet and having sufficient thickness to substantially insulate said rigid sheet from the heat of a light source;
   means positioning said sheets relative to one another;
   a light source mounted adjacent said translucent sheet directly lighting said rigid sheet; and
   said translucent sheet diffusing the rays from said light source to present a uniform non glare lighting at the surface of said rigid sheet.
2. A light table as characterized in claim 1 wherein: said translucent sheet is a rigid polystyrene foam.
3. A light table as characterized in claim 2 wherein:
   the cells immediately adjacent the light transmitting outer faces of said translucent sheet are intersected and form an open porous surface.
4. A light table as characterized in claim 1 wherein:
   said means is a bonding agent whereby said rigid light transmitting sheet and said plastic foam sheet form a laminated beam structure; and said translucent closed cell plastic foam sheet coacting with said rigid sheet has sufficient shear strength to maintain said rigid sheet substantially planar in normal use.
5. A light table as characterized in claim 1 including:
   an elastomeric vinyl sheet overlaying said rigid sheet for providing a drafting surface.
6. A light table as characterized in claim 1 comprising:
   said translucent sheet being a rigid polystyrene foam having a thickness of approximately three-fourths to one inch; and
   said rigid sheet being plexiglass having a thickness of approximately one-eighth of an inch.
7. A light table as characterized in claim 4 comprising:
   a second rigid transparent sheet disposed in parallel relation to said first rigid sheet and joined to said translucent sheet forming a sandwich laminated beam structure.

References Cited by the Examiner
UNITED STATES PATENTS

| | | | |
|---|---|---|---|
| 1,018,607 | 2/1912 | Dearborn | 108—23 |
| 1,676,440 | 7/1928 | Jackson | 108—23 |
| 1,846,878 | 2/1932 | Kopp | 200—4 |
| 1,887,288 | 11/1932 | Clausen | 108—23 |
| 2,350,340 | 6/1944 | Darby | 108—23 |
| 2,430,862 | 11/1947 | Carscallen et al. | 108—23 |
| 3,032,917 | 5/1962 | Shine | 108—23 |
| 3,104,492 | 9/1963 | Banks | 108—23 |

FOREIGN PATENTS 1,096,603  6/1955  France.

FRANK B. SHERRY, *Primary Examiner.*

G. O. FINCH, *Assistant Examiner.*